(12) United States Patent
Bouvet et al.

(10) Patent No.: US 10,158,895 B2
(45) Date of Patent: Dec. 18, 2018

(54) METHOD OF RESERVING A BANDWIDTH IN A NETWORK FOR THE EXECUTION OF A SERVICE ON A USER TERMINAL

(71) Applicant: Orange, Paris (FR)

(72) Inventors: Eric Bouvet, Montreuil le Gast (FR); Herve Michel Marchand, Vern sur Seiche (FR)

(73) Assignee: ORANGE, Paris (FR)

( * ) Notice: Subject to any disclaimer, the term of this patent is extended or adjusted under 35 U.S.C. 154(b) by 77 days.

(21) Appl. No.: 15/106,142

(22) PCT Filed: Dec. 17, 2014

(86) PCT No.: PCT/FR2014/053387
§ 371 (c)(1),
(2) Date: Jun. 17, 2016

(87) PCT Pub. No.: WO2015/092273
PCT Pub. Date: Jun. 25, 2015

(65) Prior Publication Data
US 2017/0019691 A1 Jan. 19, 2017

(30) Foreign Application Priority Data
Dec. 17, 2013 (FR) ..................................... 13 62798

(51) Int. Cl.
*H04N 21/2385* (2011.01)
*H04N 21/24* (2011.01)
(Continued)

(52) U.S. Cl.
CPC ......... *H04N 21/2385* (2013.01); *H04L 12/66* (2013.01); *H04N 21/2402* (2013.01);
(Continued)

(58) Field of Classification Search
CPC . H04L 12/66; H04L 61/2007; H04N 21/2385; H04N 21/2402; H04N 21/43615;
(Continued)

(56) References Cited

U.S. PATENT DOCUMENTS 8,776,156 B2 * 7/2014 Ohmori ............ H04N 21/23439
725/112
2010/0293290 A1 * 11/2010 Arashin .............. H04L 12/6418
709/232

FOREIGN PATENT DOCUMENTS

EP 1480457 A2 11/2004
EP 2141868 A1 1/2010
(Continued)

OTHER PUBLICATIONS

International Search Report dated Mar. 10, 2015 for corresponding International Application No. PCT/FR2014/053387, filed Dec. 17, 2014.
(Continued)

*Primary Examiner* — Omar S Parra
(74) *Attorney, Agent, or Firm* — David D. Brush; Westman, Champlin & Koehler, P.A.

(57) ABSTRACT

A method is provided for reserving a bandwidth in a local network for a service delivered by a services platform. The service is intended to be executed on a user terminal of the network. The method includes the following acts implemented by the services platform: receiving a first request for access to the service, originating from the user terminal via a network gateway, the request selecting a service offered by the services platform, after selection of the service, determining at least one parameter defining a bandwidth required for the execution of the selected service, generating and dispatching to the terminal, via the network gateway of a universal address of the service selected including a domain name, the domain name including in a first label at least the (Continued)

parameter defining the necessary bandwidth, and other labels forming a name of the services platform.

7 Claims, 3 Drawing Sheets

(51) Int. Cl.
  *H04N 21/436* (2011.01)
  *H04N 21/472* (2011.01)
  *H04N 21/858* (2011.01)
  *H04L 12/66* (2006.01)
  *H04N 21/643* (2011.01)
  *H04L 29/12* (2006.01)

(52) U.S. Cl.
  CPC . *H04N 21/43615* (2013.01); *H04N 21/47202* (2013.01); *H04N 21/64322* (2013.01); *H04N 21/8586* (2013.01); *H04L 61/2007* (2013.01)

(58) Field of Classification Search
  CPC ....... H04N 21/47202; H04N 21/64322; H04N 21/8586
  See application file for complete search history.

(56) References Cited

FOREIGN PATENT DOCUMENTS

| | | |
|---|---|---|
| EP | 2472737 A2 | 7/2012 |
| EP | 2575302 A1 | 4/2013 |
| KR | 100656526 B1 * | 12/2006 |

OTHER PUBLICATIONS

Berners-Lee Cern L Masinter Xerox Corporation M McCahill University of Minnesota Editors T: "Uniform Resource Locators (URL); rfc1738.txt", Dec. 1, 1994, Dec. 1, 1994 (Dec. 1, 1994), XP015007525.

Chris Develder et al., "Delivering Scalable Video With QoS to the Home", Telecommunications Systems; Modeling. Analysis, Design and Management, Kluwer Academic Publishers, BO, vol. 49, No. 1, Jun. 9, 2010 (Jun. 9, 2010), pp. 129-148, XP019991731.

Written Opinion of the International Searching Authority dated Mar. 10, 2015 for corresponding International Application No. PCT/FR2014/053387, filed Dec. 17, 2014.

Mockapetris, "Domain Names—Comcepts and Facilities" rfc1034, Nov. 1987.

English translation of the Written Opinion of the International Searching Authority dated Mar. 10, 2015 for corresponding International Application No. PCT/FR2014/053387, filed Dec. 17, 2014.

* cited by examiner

METHOD OF RESERVING A BANDWIDTH IN A NETWORK FOR THE EXECUTION OF A SERVICE ON A USER TERMINAL

CROSS-REFERENCE TO RELATED APPLICATIONS

This Application is a Section 371 National Stage Application of International Application No. PCT/FR2014/053387, filed Dec. 17, 2014, the content of which is incorporated herein by reference in its entirety, and published as WO 2015/092273 A1 on Jun. 25, 2015, in English.

FIELD OF THE DISCLOSURE

The invention pertains to the field of the management of the quality of service in a telecommunications network. It relates more precisely to the reservation of a bandwidth necessary for a multimedia stream intended to be read on a user terminal of a residential network, in such a way that the stream is not degraded with respect to other streams of this network.

The invention finds a particularly beneficial application in a residential environment in which a plurality of terminals is adapted for accessing a multimedia service platform of the Internet network through a residential gateway so as to read a multimedia content according to a certain level of quality of service.

BACKGROUND OF THE DISCLOSURE

In a conventional residential environment, a particular device called a TV decoder (or "STB", for "Set Top Box") is adapted for displaying a multimedia content on the screen of a television. A video on demand ("VoD") service, rendered by the service platform, allows a user to order a content by specifying preferences in relation to this content, for example the definition in which he wishes to view the film. These preferences define a certain level of quality of service and in particular they condition the bandwidth required for the stream to be transmitted to the decoder. The service is in general billed as a function of the level of quality of service required, the bill increasing with the level of quality of service. To guarantee the level of quality of service requested throughout the distribution of the content from the service platform to the decoder, it is customary, in the residential environment, for the gateway to establish a favored link with this decoder and to reserve the resources necessary so that the required quality of service is provided on this link in such a way as to guarantee the level of quality of service for the streaming of contents. The reserving of resources thus consists in reserving a certain bandwidth and in choosing a class of service suitable for the service rendered by the platform, for example the "CBR" ("Constant Bit Rate") mode for a video service. A favored link such as this can be defined by the residential gateway by configuration, by associating chosen quality-of-service parameters with an Ethernet socket to which the decoder is connected, or by associating these parameters with a MAC ("Media Access Control") address corresponding to the address of the decoder. The stream conveyed between the residential gateway and the decoder, and therefore between the service platform and the decoder, then benefits from the quality of service defined by the parameters which have been chosen. Thus, for example, if the user orders a film in HD (for "High Definition") and is billed accordingly, he is assured of viewing the film in HD on his television.

In general the residential network comprises other devices, termed "OTT" ("Over The Top") generic devices or terminals, such as PCs ("Personal Computers"), digital tablets, etc., which access the residential gateway and which are able to access a service platform so as to order a content to be displayed on the screen of the generic terminal. However, such terminals do not have the same guarantee of quality of service as a dedicated device such as a TV decoder. It is thus not possible to define favored links for generic terminals such as these so as to guarantee a certain level of quality of service between these terminals and the network. In general, the streams arising from these terminals are processed by the gateway in "best effort" mode. This mode does not provide any differentiation between these streams and does not make it possible to guarantee a given quality of service for a particular stream, which requires for example a higher bitrate than other streams. Thus when a user executes a video on demand service on his terminal and orders a film in High Definition from a service platform, he has no guarantee that the quality of service ordered is actually provided to him, except by modifying his terminal so as to integrate specific modules, adapted for managing the quality of service on the terminal, or for controlling the quality of service of the gateway. Such a module will for example act on a video reader of the terminal (the term customarily used is "player") so as to implement a progressive video download associated with waiting constraints.

No solution currently exists whereby an arbitrary generic terminal, that is to say one which is unmodified, is guaranteed the quality of service requested during access to a service.

SUMMARY

An exemplary embodiment of the invention proposes a method for reserving a bandwidth in a local network for a service delivered by a service platform, said service being intended to be executed on a user terminal of said network, said method comprising the following steps, implemented by the service platform:
  reception of a first request for access to the service, originating from the user terminal via a network gateway, said request being intended to select a service offered by the service platform,
  after selection of the service, determination of at least one parameter defining a bandwidth necessary for the execution of the selected service,
  generation and dispatching to the terminal via the network gateway of a universal address of the selected service comprising a domain name, said domain name comprising in a first label at least the parameter defining the necessary bandwidth, and other labels forming a name of the service platform.

Thus, by virtue of the bandwidth reservation method, a generic terminal for which the quality of service is customarily managed in the best way by the residential gateway, that is to say in "best effort" mode, can henceforth have the gateway reserve it sufficient bandwidth for a service ordered from the service platform and thus have the stream associated with this service prioritized with respect to other streams in the local network.

It is the service platform which defines the quality-of-service parameters which it needs for the service required from the user terminal. The parameters are therefore specified service by service, and completely suitable for the service required. Moreover, even if the parameters are transmitted from the platform to the terminal and then from the terminal to the residential gateway, more precisely to the DNS relay of the gateway, the terminal is not impacted by the method. Indeed, the terminal transmits to the gateway in a transparent manner and in a standard message, in this instance in a domain name composed of a plurality of labels, the quality-of-service parameters required by the service platform. The parameters are included in a first label of the domain name. Thus, with respect to known solutions which consist in modifying the user terminal so as to install on the latter specific modules adapted for managing the quality of service on the terminal or to control the quality of service on the gateway, the solution proposed here does not necessitate any modification of the user terminal. This solution does not therefore impose any additional constraint on the user's environment.

In an advantageous manner, the bandwidth reservation method comprises the reception of a second request for access to said service, said reception being representative of the actual reservation by the network gateway of the bandwidth necessary for the execution of the service.

By virtue of the reception of the second request for access to the service, the service platform is informed that the network gateway has taken into account the quality-of-service parameters for the provision of the service in accordance with the user's selections. More precisely, if the platform receives the second service request, this signifies that the quality-of-service parameters have actually been reserved by the network gateway for the stream arising from/destined for the user terminal. The method thus avoids possible legal disputes related to the billing of the service. Indeed, the service, ordered by the user, is delivered to the user terminal only in the case where the network gateway has been able to guarantee the quality-of-service parameters necessary for this order. The service platform therefore bills the user in accordance with what the user has ordered.

The invention also relates to a method of configuration by a network gateway of a bandwidth for the execution of a service on a user terminal of a local network (100), said service being delivered by a service platform, said method comprising the following steps, implemented by the network gateway:
  reception of a first request for access to the service, originating from the user terminal and destined for the service platform, said request being intended to select the service,
  after selection of the service from the terminal with the service platform, reception from the service platform and then transmission to the terminal, of a universal address of the selected service comprising a domain name, said domain name comprising in a first label at least one parameter defining a bandwidth necessary for the execution of the selected service, and following labels forming a name of the service platform,
  reception from the terminal of a resolution request in respect of the domain name,
  analysis of the domain name and reservation of the bandwidth necessary for the execution of the service for a stream lying between the terminal and the service platform, said bandwidth being included in the first label of the domain name,
  dispatching to the terminal of the IP address associated with the name of the service platform.

A resolution request in respect of a domain name is cleverly used to transmit from the terminal to the residential gateway quality-of-service parameters comprising at least the bandwidth necessary for the execution of the service. The domain name thus comprises in a first label the quality-of-service parameters. The DNS relay of the residential gateway receives the request and a resolution module of the relay makes it possible to extract the parameters from the request in such a way that they are taken into account by the residential gateway.

In an exemplary embodiment, the first label also comprises a class of service intended to accord a priority to a stream associated with the service in the local network.

The class of service allows the gateway to reserve resources on a link of the local network which allows the terminal to access the Internet and therefore to access the service. The class of service thus allows the platform to fix a priority for the traffic of this link.

In an advantageous manner, the first label also comprises a duration specifying the time for which the network gateway must guarantee the reservation of the bandwidth.

Specifying a duration in the label makes it possible to indicate to the residential gateway the time for which the configuration in terms of quality-of-service parameters must be maintained for the stream associated with the service delivered to the user terminal and therefore the time for which the stream associated with the service must be prioritized with respect to others.

The invention also relates to a network service platform, intended to deliver at least one service to at least one user terminal of a local network via a network gateway, said platform comprising:
  reception means, designed to receive a first request for access to the service, originating from the user terminal via the network gateway, said request being intended to select a service offered by the service platform,
  determination means, designed to determine at least one parameter defining a quality of service for the execution of the selected service,
  generation and dispatching means, designed to generate and to dispatch to the user terminal via the network gateway a universal address of the service selected from the user terminal, said address comprising a domain name, said domain name comprising in a first label at least one parameter defining a bandwidth necessary for the execution of the selected service, and other labels forming a name of the service platform.

The invention also pertains to a network gateway of a local network, said network comprising at least one user terminal, a user of said terminal wishing to access a service delivered by a service platform, the gateway comprising:
  first reception means, designed to receive a first request for access to the service, originating from the user terminal and destined for the service platform, said request being intended to select the service,
  reception and transmission means, designed to receive from the service platform, after selection of the service from the terminal, and to transmit to the terminal a universal address of the selected service comprising a domain name, said domain name comprising in a first label at least one parameter defining a bandwidth necessary for the execution of the selected service, and other labels forming a name of the service platform,
  second reception means, designed to receive from the terminal a resolution request in respect of the domain name,
  means for domain name analysis and for configuration, designed to analyze the domain name and reserve the bandwidth necessary for the execution of the service for a stream lying between the terminal and the service platform, said bandwidth being included in the first label of the domain name, dispatching means, designed to dispatch the IP address associated with the name of the service platform to the terminal.

The invention also relates to a message intended to be transmitted from a service platform to a user terminal via a network gateway, subsequent to a reception by the platform of a first request for access to the service and of a selection of the service from the user terminal, said message comprising a domain name comprising in a first label at least one parameter defining a bandwidth necessary for the execution of a selected service on the service platform and in other labels a name of the service platform, the domain name being intended to be transmitted from the terminal to the network gateway in a domain name resolution request, the first label being intended to reserve the bandwidth necessary for the execution of the service at the level of the network gateway.

The invention also relates to a computer program intended to be installed in a memory of a service platform of a network, comprising instructions for the implementation of the steps of the previously cited method for reserving a bandwidth, when the program is executed by a processor of the service platform.

The invention also relates to a data medium on which the previously cited program is recorded.

The invention also pertains to a computer program intended to be installed in a memory of a network gateway, comprising instructions for the implementation of the steps of the previously described method of configuration by a network gateway of a bandwidth, when the program is executed by a processor of the network gateway.

The invention also relates to a data medium on which the previously cited program is recorded.

BRIEF DESCRIPTION OF THE DRAWINGS

Other characteristics and advantages of the present invention will be better understood from the description and appended drawings among which.

DETAILED DESCRIPTION OF ILLUSTRATIVE EMBODIMENTS

Figure 1:
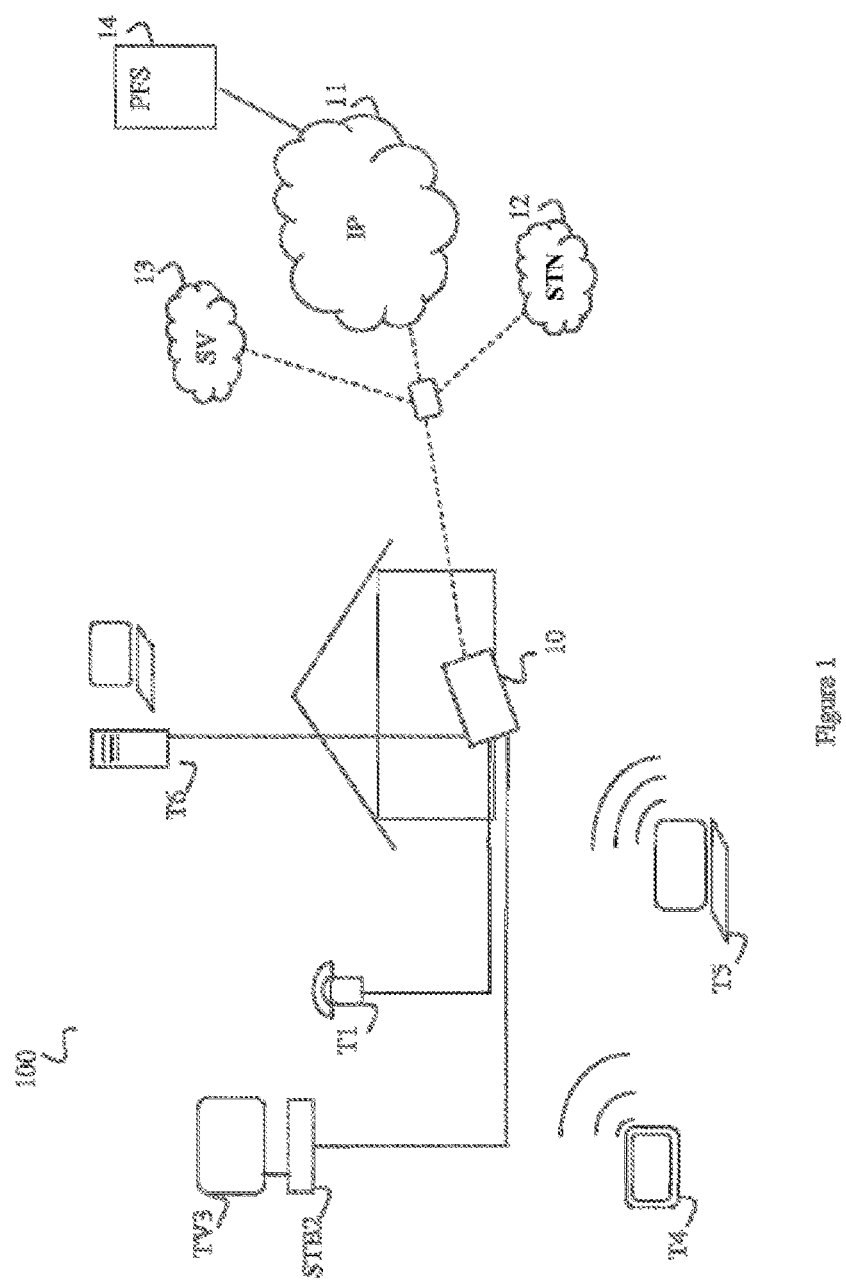
FIG. 1 is a schematic representation of an exemplary architecture of a residential network, in which the method of the invention is implemented.

An exemplary network architecture in which a bandwidth reservation method is implemented, according to an exemplary embodiment of the invention, will now be presented in conjunction with FIG. 1.

A high-speed residential gateway, termed an xDSL gateway 10 ("x Digital Subscriber Line"), is adapted for offering a subscriber user (not represented in FIG. 1) a plurality of services: Internet access, fixed telephony, television. The xDSL residential gateway 10 thus offers various of the subscriber's devices T1, STB2, TV3, T4, T5, T6, organized as a local network 100, functions for access to various networks, such as the Internet network 11, the public switched telephone network (or "PSTN") 12, one or more video servers 13 of content provider(s). Among these devices, a fixed telephone T1 accesses the public switched telephone network 12. A TV decoder STB2 (the term customarily used is "Set To Box", or "STB") is adapted for allowing the display, on the screen of a television TV3, of a multimedia content accessible from a video server 13. It is customary that, for this decoder STB2, the xDSL gateway 10 guarantees, according to the type of service requested, a given level of quality of service by configuration. For example, when a user accesses a video on demand ("VoD") service and orders a multimedia content in High Definition ("HD"), the xDSL gateway 10 guarantees sufficient bandwidth for the content to be distributed in high definition. Other devices T4, T5, T6 of the residential network 100, called generic devices, or "OTT" ("Over The Top") devices, access for example Internet services via the xDSL gateway 10. Such devices are for example a digital tablet T4, a portable PC T5, a fixed PC T6. For these generic devices T4, T5, T6, the quality of service is customarily managed in "best effort" mode by the xDSL gateway 10, that is to say that the xDSL gateway 10 cannot differentiate the streams destined for or arising from these terminals and therefore does not guarantee these devices any level of quality of service.

The xDSL gateway 10 offers the devices of the local network 100 a plurality of functions, such as a network access function, in wired mode or in wireless mode, a function for routing packets inside the local network 100 and originating from or destined for a network 11, 12, 13, a "DHCP" ("Dynamic Host Configuration Protocol") server function, a "DNS" ("Domain Name System") relay function, etc. The DHCP server function is intended to ensure the automatic configuration of the private IP addresses of the IP devices of the local network 100. The DNS system makes it possible to establish a correspondence between comprehensible and easy to retain names, called domain names, or "FQDN" ("Fully Qualified Domain Name"), for example www.monsite.fr, and IP addresses. For this purpose, the DNS relay function of the xDSL gateway is intended to resolve domain names requested by IP terminals of the local network 100, either by providing in response to a request an IP address stored in a cache memory (not represented in FIG. 1), or by requesting the resolution of the domain name from a DNS server of the Internet network (not represented in FIG. 1). A domain name customarily comprises a plurality of labels separated by full stops, for example "A.B.C.D". The domain names constitute a hierarchical space guaranteeing the uniqueness of a name in a hierarchical structure. A domain is a sub-domain of another domain if it is contained in this domain. For example, A.B.C.D is a sub-domain of B.C.D. By traversing the hierarchy of domain names in the downward direction, it is also possible to state that the root domain, denoted ".", has "D" as immediate sub-domain, which itself has "C" as immediate sub-domain, etc. Refer to RFC IETF 1034 ("Request For Comments" and "Internet Engineering Task Force") for a complete presentation of domain names. All the IP devices of the local network 100 are parametrized so as to transmit the DNS requests for domain name resolution to the xDSL gateway 10, more precisely to the DNS relay of the gateway. Thus, any DNS request originating from the terminals is dispatched and processed by the xDSL gateway 10.

A digital content is offered by a service platform 14 accessible from the Internet network 11. The content is customarily designated by a universal address, or "URL" ("Uniform Resource Locator") and a user terminal wishing to access this content uses this universal address to access same. Such an address provides both information on the location of the content and information on the associated protocol for consuming it, that is to say for viewing it in the case of a video content. For example, the address is of the form http://<host>/content1, indicating that the content is accessible using the "http" protocol ("HyperText Transfer Protocol"), and where <host>designates a server name, in the form of an IP address or of a domain name, and content1, an address of the content on the server. The format of the URL universal addresses is defined in RFC 1738.

According to the exemplary embodiment described here, the xDSL gateway 10 is designed to recognize in a domain name, received from a terminal of the local network 100 during a domain name resolution request, quality-of-service parameters, and to take these parameters into account, that is to say to extract these parameters from the domain name and to set up a configuration which makes it possible to guarantee for the user terminal a level of quality of service specified by the parameters for the streams destined for or/and originating from this terminal. To this end, the xDSL gateway 10 comprises code instructions for implementing the steps of the method described here for configuring a bandwidth and which are executed by the gateway.

Likewise, the service platform 14 is designed to construct, upon a content access request arising from a user terminal, a universal address which comprises in the domain name a label intended to specify quality-of-service parameters for the stream associated with the access request. To this end, the service platform 14 comprises code instructions for implementing the steps of the method described here for reserving a bandwidth and which are executed by the service platform.

Figure 2:
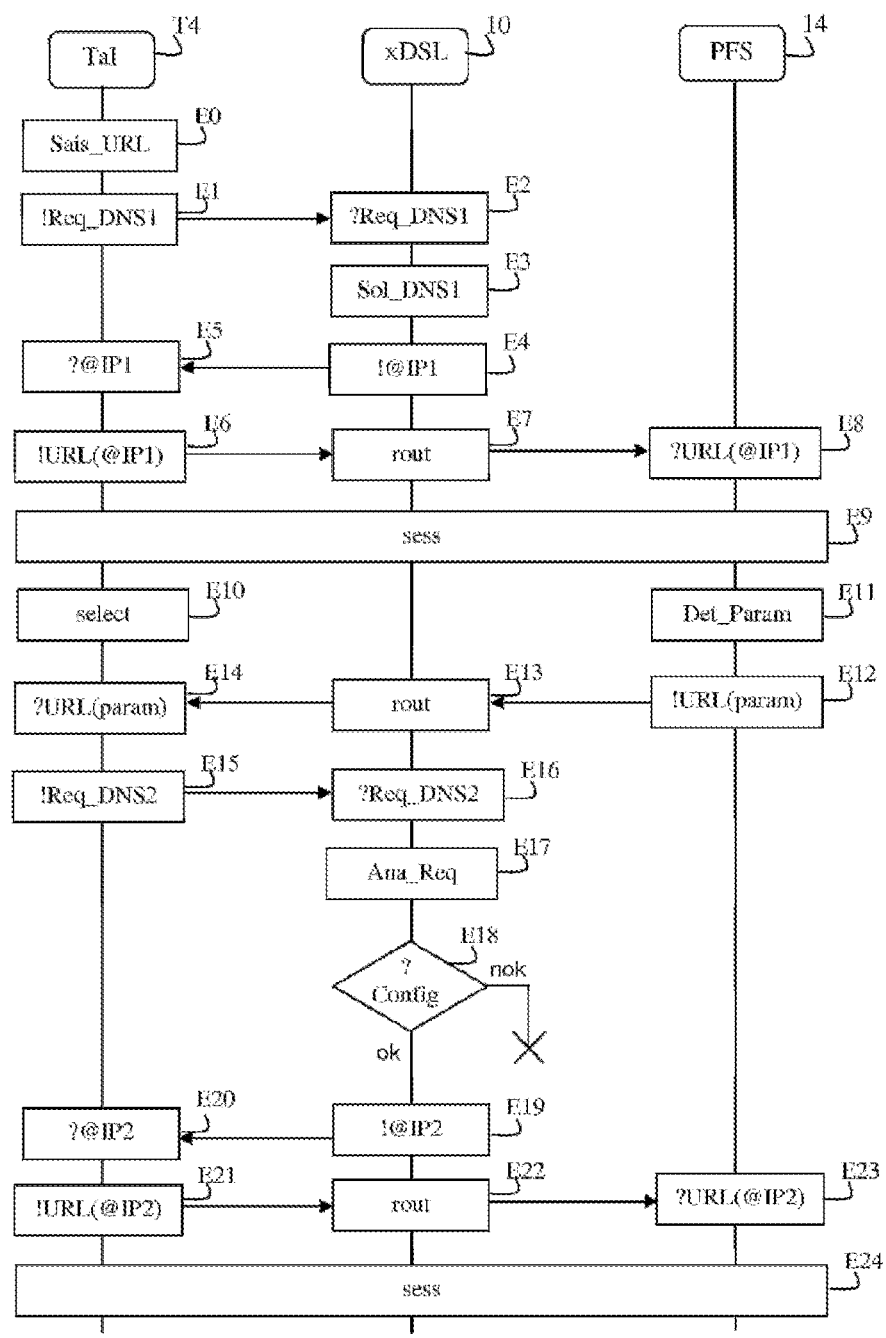
FIG. 2 presents the steps of a method for reserving a bandwidth in a residential network, according to an exemplary embodiment of the invention.

The steps of a method for reserving a bandwidth for a service delivered by a service platform and intended to be executed on a user terminal in a local network, according to an exemplary embodiment, will now be described in conjunction with FIG. 2.

It is assumed that a user of a device of the local network 100 wishes to access a service requiring a given level of quality of service from a generic terminal whose quality of service is customarily managed in best effort mode by the xDSL gateway 10.

In a prior ordering phase, the user, by means of a browser of one of his terminals, for example his digital tablet T4, accesses the service platform 14 via the Internet and chooses a multimedia content, a mode of viewing, for example HD and validates his order. Accordingly, in an initial inputting step E0, he inputs for example an http request corresponding to the address of the service platform in his browser. The request is for example of the form "http://www.PFS.com".

In a conventional manner, the terminal T4, parametrized to request the resolution of the domain names by the xDSL gateway 10, transmits in a transmission step E1 a first domain name resolution request to the DNS relay of the xDSL gateway 10 so as to obtain the IP address of the service platform 14. The first request comprises the domain name to be resolved, that is to say "www.PFS.com". The first request is received by the xDSL gateway 10 in a reception step E2.

In a resolution and response step E3, the DNS relay of the xDSL gateway 10 resolves the domain name and transmits to the terminal T4, in response to the first request for domain name resolution, the corresponding IP address. In a first case of resolution, the domain name has been recently resolved by the DNS relay and the IP address appears in a cache memory (not represented in FIG. 1) of the xDSL gateway 10. In a second case of resolution, the IP address is not stored in cache memory and is obtained by the DNS relay of the xDSL gateway 10 after dispatching of the first request for resolution to a DNS server of the IP network. The IP address of the service platform 14 is dispatched by the xDSL gateway 10 to the terminal T4 in a dispatching step E4. It is received by the terminal T4 in a reception step E5.

In a step E6 of access to the service platform, the terminal T4 dispatches a first request for access to the service in the form of one or more IP packets. The IP packet comprises the URL universal address of the service platform and in the destination field of the packet, the IP address previously obtained. The packet is routed by the xDSL gateway 10 in a routing step E7. It is received by the service platform 14 in a reception step E8.

In a display and ordering step E9, an access page for the service is then displayed on the screen of the user's terminal T4, a session being established between the terminal T4 and the service platform 14. The user then chooses a content and, if appropriate, specific viewing parameters. For example, in the case of a multimedia content, the user of the terminal T4 selects the HD resolution mode. He validates his choices on termination of a selection step E10.

In a following step E11 of determining quality-of-service parameters, the service platform 14 determines, on the basis of the user's choices, a set of quality-of-service parameters intended for the xDSL gateway 10. More precisely, these parameters are intended to allow the xDSL gateway to set up a configuration specific to the chosen multimedia content and in accordance with the user's selections in terms of quality of service. By virtue of these parameters, the xDSL gateway 10 must be able to prioritize the stream specific to this content with respect to other, lower priority, streams of the residential network 100. Thus, a content that the user will have chosen and paid for consequently will be assured of benefiting from necessary resources inside the local network 100. The set of parameters which can be determined by the service platform 14 on the basis of the user's choices comprises for example a minimum bitrate, or bandwidth BR to be guaranteed on the channel through which the multimedia content will travel, a class of service CoS for the multimedia content. The class of service CoS can be defined by a priority to be given to a stream inside the local network 100 by the xDSL gateway 10. For example, this priority complies with "IEEE" ("Institute of Electronic and Electronics Engineers") standards, such as 802.1p, 802.3, etc. which define eight different classes of service in the local network 100, such as "BE" (for "Best Effort"), "VI" (for "Video"), "VO" (for "Voice"), etc. In another exemplary embodiment, the class of service can be defined by means of a sampling rate SR corresponding to a particular encoding of data circulating outside the local network 100, that is to say between the service platform 14 and the xDSL gateway 10. An exemplary sampling rate SR is "CBR" ("Constant Bit Rate"), suitable for continuous content streaming. Another quality-of-service parameter consists of a duration T for which the quality-of-service resources must be reserved on the channel. Specifying the duration T is advantageous since this parameter makes it possible to temporally limit the reservation of certain resources. Thus, if the configuration set up for the priority stream penalizes other streams, that is to say if other streams have to be degraded for the benefit of the multimedia stream corresponding to the user's selection, the duration for which the stream is prioritized to the detriment of other streams is temporally limited. The duration T is for example equal to the duration of the multimedia content. In a variant embodiment, the duration is greater than the duration of the content. It is for example 25% bigger than the duration of the content so as to take account of possible pauses by the user while reading the content.

In a step E12 of constructing the universal address and of dispatching, the service platform 14 constructs a universal address of the content selected by the user which comprises the quality-of-service parameters determined in the course of the previous step E11. For example, the universal address is of the form: "http://QoSv1_BR-2000_CoS-VIT-180.www.PFS.com/ValidateQoS?ID". Thus, the quality-of-service parameters determined by the service platform 14 are specified in the part of the universal address which defines the name of the host, or domain name, composed of labels separated by a full stop. They appear in a label of the domain name associated with the platform 14. The universal address thus constructed is intended to allow the terminal to convey quality-of-service parameters to the xDSL gateway 10 in a transparent manner. The last part of the universal address, here "ValidateQoS?AD", indicates an address on the server, here, a validation page on the service platform. If the terminal T4 accesses this page, then the service platform 14 is assured that the parameters defined in a label of the domain name of the universal address have been taken into account by the xDSL platform 10. The universal address thus constructed is dispatched by the service platform 14 to the terminal T4 at the end of step E12. The universal address is routed by the xDSL gateway 10 in the course of a routing step E13 and received by the terminal T4 in the course of a reception step E14.

In a step E15 of dispatching a second resolution request, the terminal T4, parametrized to ask the xDSL gateway, more precisely the DNS relay of the xDSL gateway 10, for resolution of domain names, dispatches a second DNS request which comprises the host part of the universal address, in this instance "QoSv1_BR-2000_CoS-VI_T-180.www.PFS.com" so as to obtain in response the IP address of the machine on which the multimedia content that the user has ordered is located. The second DNS request is received by the xDSL gateway, more precisely by the DNS relay of the gateway 10, in a reception step E16.

In a step E17 of analyzing the DNS request and of configuration, the xDSL gateway, more precisely the DNS relay of the xDSL gateway 10, analyzes the second DNS request received. Such an analysis is implemented by a resolution module of the DNS relay of the xDSL gateway 10. The resolution module identifies that a label of the domain name pertains to quality-of-service parameters. For example, the resolution module is adapted for recognizing a keyword, for example "QoS". The first label of the domain name is thus extracted from the name of the host and transmitted to the xDSL gateway 10. The xDSL gateway 10 processes the quality-of-service parameters which are specified in the first label of the domain name. More precisely, the xDSL gateway 10 reserves, if it can, a bandwidth of 2000 kbits/s with a class of service CoS VI, corresponding to a priority associated with the traffic destined for/originating from the terminal T4 in the local network 100, for a duration of 180 minutes for the stream destined for/originating from the terminal T4. In a verification step E18, the xDSL gateway 10 verifies that the parameters were able to be fixed, in accordance with the values specified in the first label of the domain name. If such is the case, ("ok" branch in FIG. 1), the DNS relay of the gateway 10 dispatches the IP address associated with the name of the server formed by the following labels of the domain name, here www.PFS.com in a step E19 of dispatching the address. As previously, either the IP address is stored in cache memory of the xDSL gateway 10, or the resolution of the name is requested of a DNS server of the IP network. The IP address is received by the terminal in a reception step E20.

In a step E21 of access to the service platform, the terminal T4 dispatches a second request for access to the service in the form of one or more IP packets. The IP packet comprises the URL universal address of the service platform 14 and, in the destination field of the packet, the IP address of the service platform 14 received in the course of the reception step E20. The packet is routed by the xDSL gateway 10 in a routing step E22 and received by the service platform 14 in a reception step E23.

In a validation step E24, the terminal T4 accesses a validation page for validating its order. This validation is intended on the one hand to inform the user that he can access the content in accordance with the selections that he has made. Moreover, the service platform, by receiving the packet in the course of step E23, is assured at this juncture that the quality-of-service parameters that it dispatched to the terminal T4 in the course of step E12 have been taken into account by the xDSL gateway 10 and that the content can be distributed with the required quality of service. Thus, the method avoids any dispute related to the billing of the service. Indeed, the billing for the service delivered by the service platform 14 is dependent on the quality of service actually rendered and not solely dependent on the quality of service requested by the user.

In a case where the xDSL gateway 10 has not been able to fix the quality-of-service parameters included in the first label of the universal address of the service platform 14, for example, if the gateway has not been able to reserve the requested bandwidth, then ("nok" branch in FIG. 1) it dispatches, by way of the DNS relay, a DNS error intended to indicate that the IP address resolution has failed. In another exemplary embodiment, the xDSL gateway 10 dispatches, in response to the second DNS request, a specific IP address that it has previously configured and which allows the user terminal T4 to access an error page indicating that the parametrization of the gateway is incompatible with the user's choices. This exemplary embodiment has the advantage of providing an explicit message to the user of the terminal. In both cases, the method stops.

The method is described here in the case of an xDSL residential gateway. The invention is not limited to this type of gateway and is applicable to network gateways offering other types of access, for example optical fiber access.

In the exemplary embodiment described, the second DNS request, dispatched by the user terminal T4 to the xDSL gateway 10, is of the form "QoSv1_BR-2000_CoS-VI_T-180.www.PFS.com". Here, the service platform 14 has fixed the class of service at a priority to be fixed in the local network 100. In another exemplary embodiment, the service platform 14 defines the class of service as a sampling rate SR. The second DNS request is then for example of the form "QoSv1_BR-2000_SR-CBR_T-180.www.PFS.com". In this case, during the analysis and configuration step E17, the xDSL gateway 10 associates with the stream originating from/destined for the terminal T4 in the local network 100, a priority compatible with the sampling rate SR.

In the exemplary embodiment described here, the user terminal T4 is a digital tablet. The invention is of course not limited to this type of terminal and also applies when the user accesses the service platform 14 from other generic devices, such as a portable PC, a fixed PC, a games console with Internet access, an IP telephone, etc.

Figure 3:
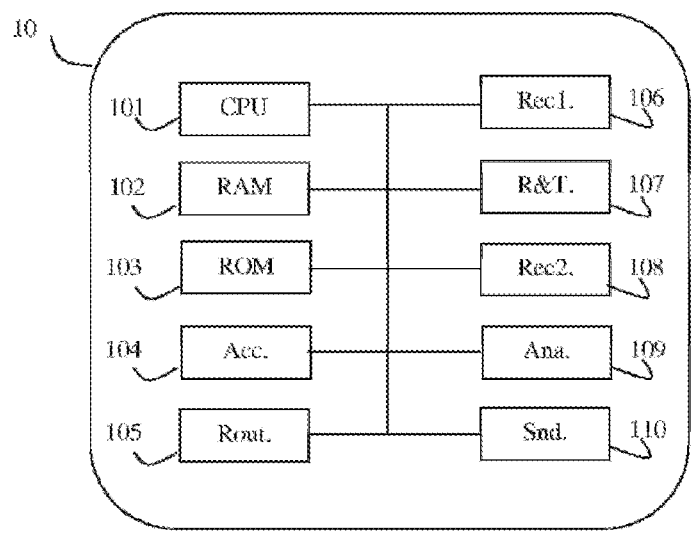
FIG. 3 is a schematic representation of a domestic gateway, according to an exemplary embodiment of the invention.

An xDSL gateway 10, according to an exemplary embodiment of the invention, will now be described in conjunction with FIG. 3. The xDSL gateway 10 is a network gateway with high-speed ADSL interface which makes it possible to simultaneously access various types of service: Internet, telephone services, additional services such as TV, Video on Demand. The xDSL gateway 10 is a computerized device which comprises:

- a microprocessor 101, or "CPU" ("Central Processing Unit"), intended to load instructions into memory, to execute them, to perform operations;
- a set of memories, including a volatile memory 102, or "RAM" (for "Random Access Memory") used to execute code instructions, store variables, etc., a storage memory 103 of "ROM" ("Read Only Memory") or "EEPROM" ("Electronically-Erasable Programmable Read-Only Memory") type. The storage memory 103 is designed to store an application which comprises code instructions for implementing the steps of the method for configuring a bandwidth for the execution of a service on a user terminal. The storage memory 103 is also designed to store a configuration of quality-of-services parameters for streams arising/originating from terminals of the local network 100;
- an access module 104, designed to offer network access to the terminals of the local network 100. The access module 104 thus offers various types of access in the local network: wireless access, according to various protocols, for example Wifi, BlueTooth, wired access via USB port, Ethernet port, etc.;
- a routing module 105, designed to route packets inside the local network 100 and originating from or destined for the terminals of the local network to or from the Internet network;

The xDSL gateway 10 also comprises:

- first reception means 106, designed to receive a first request for access to a service originating from the user terminal, said request being intended to select the service. The first reception means 106 are designed to implement step E7 of the previously described method for reserving a bandwidth,
- reception and transmission means 107, designed to receive from the service platform, after selection of the service from the user terminal, and to transmit to the user terminal a universal address of the selected service comprising a domain name, said domain name comprising in a first label at least one parameter defining a quality-of-service parameter necessary for the execution of the selected service and following labels forming a name of the service platform. An exemplary quality-of-service parameter is the bandwidth necessary for the service. The reception and transmission means 107 are designed to implement the routing step E13 of the previously described method,
- second reception means 108, designed to receive from the terminal a resolution request in respect of the domain name. The second reception means 108 are designed to implement the reception step E16 of the previously described method,
- means 109 for domain name analysis and for configuration, designed to analyze the domain name received in the domain name resolution request and to configure the platform in terms of quality of service, that is to say as a function of the at least one quality-of-service parameter included in the first label of the universal address. Configuration thus consists at least in reserving the bandwidth necessary for the execution of the service for a stream lying between the terminal and the service platform, said bandwidth being included in the first label of the domain name. The analysis and configuration means 109 are designed to implement the analysis and configuration step E17 of the previously described method,
- dispatching means 110, designed to dispatch the IP address of the service platform to the terminal. The dispatching means 110 are designed to implement the address dispatching step E19 of the previously described method.

The access module 104, routing module 105, the first reception means 106, the reception and transmission means 107, the second reception means 108, the means 109 for domain name analysis and for configuration and the dispatching means 110 are preferably software modules comprising software instructions for executing the steps of the method for configuring a bandwidth for the execution of a service on a user terminal described previously.

The invention therefore also relates to:

- a computer program comprising instructions for the implementation of the configuration method such as described previously when this program is executed by a processor of the xDSL gateway 10;
- a readable recording medium on which the computer program described hereinabove is recorded.

The software modules can be stored in or transmitted by a data medium. The latter can be a hardware storage medium, for example a CD-ROM, a magnetic diskette or a hard disk, or else a transmission medium such as a signal or a telecommunications network.

Figure 4:
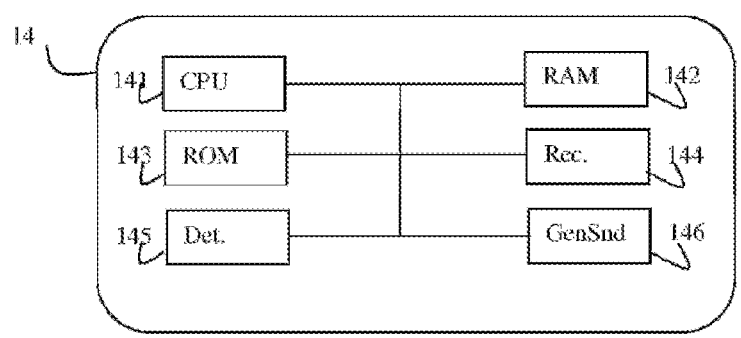
FIG. 4 is a schematic representation of a service platform, according to an exemplary embodiment of the invention.

A service platform 14, according to an exemplary embodiment of the invention, will now be described in conjunction with FIG. 4.

The service platform 14 is a computerized server intended to offer services, such as multimedia contents, to users who access it remotely via the Internet network. The service platform 14 comprises:

- a microprocessor 141, intended to load instructions into memory, to execute them, to perform operations;
- a set of memories, including a volatile memory 142 of RAM type, used to execute code instructions, store variables, etc., a storage memory 143 of ROM or EEPROM type. The storage memory 143 is designed to store an application which comprises code instructions for implementing the steps of the method for reserving a bandwidth for a service delivered by the service platform 14. The storage memory 143 is also designed to store multimedia contents intended to be offered to users;

The service platform 14 also comprises:

- reception means 144, designed to receive a first request for access to the service, originating from the user terminal via the xDSL gateway 10, said request being intended to select a service offered by the service platform. The reception means 144 are designed to implement the reception step E8 of the previously described method for reserving a bandwidth,
- determination means 145, designed to determine at least one quality-of-service parameter, said parameter defining a bandwidth necessary for the execution of the selected service. The determination means 145 are designed to implement step El 1 of the previously described method,
- generation and dispatching means 146, designed to generate a universal address of the service selected from the user terminal, said address comprising a domain name, said domain name comprising in a first label at least one parameter defining a bandwidth necessary for the execution of the selected service, and following labels forming a name of the service platform. The generation and dispatching means 146 are also designed to dispatch the universal address thus constructed to the user terminal via the xDSL gateway. The generation and dispatching means 146 are designed to implement the universal address construction and dispatching step E12 of the previously described method.

The reception means 144, determination means 145 and generation and dispatching means 146 are preferably software modules comprising software instructions for executing the steps of the previously described method for reserving a bandwidth.

The invention therefore also relates to:
- a computer program comprising instructions for the implementation of the method for reserving a bandwidth, such as described previously, when this program is executed by a processor of the service platform 14;
- a readable recording medium on which the computer program described hereinabove is recorded.

An exemplary embodiment of the present disclosure remedies inadequacies/drawbacks of the prior art and/or affords improvements thereto.

Although the present disclosure has been described with reference to one or more examples, workers skilled in the art will recognize that changes may be made in form and detail without departing from the scope of the disclosure and/or the appended claims.

The invention claimed is:

1. A method comprising:
configuring, by a network gateway, a bandwidth for execution of a service on a user terminal of a local network, said service being delivered by a service platform, wherein configuring comprises the following acts, implemented by the network gateway:
reception of a first request for access to the service, originating from the user terminal and destined for the service platform, said request being configured to select the service,
after selection of the service from the terminal with the service platform, reception from the service platform and then transmission to the terminal, of a universal address of the selected service comprising a domain name, said domain name comprising in a first label at least one parameter defining a bandwidth necessary for the execution of the selected service, and following labels forming a name of the service platform,
reception from the terminal of a resolution request in respect of the domain name,
analysis of the domain name and reservation of a bandwidth necessary for the execution of the service for a stream lying between the terminal and the service platform, said bandwidth being included in the first label of the domain name,
dispatching to the terminal the IP address associated with the name of the service platform.

2. A network gateway of a local network, said local network comprising at least one user terminal, a user of said terminal wishing to access a service delivered by a service platform, the network gateway comprising:
first reception means for receiving a first request for access to the service, originating from the user terminal and destined for the service platform, said request selecting the service,
reception and transmission means for receiving from the service platform, after selection of the service from the terminal, and for transmitting to the terminal a universal address of the selected service comprising a domain name, said domain name comprising in a first label at least one parameter defining a bandwidth necessary for execution of the selected service, and other labels forming a name of the service platform,
second reception means for receiving from the terminal a resolution request in respect of the domain name,
means for analyzing the domain name and configuring the network gateway to reserve a bandwidth necessary for execution of the service for a stream lying between the terminal and the service platform, said bandwidth being included in the first label of the domain name, and
dispatching means for dispatching the IP address associated with the name of the service platform to the terminal.

3. The method as claimed in claim 1, in which the first label also comprises a class of service according a priority to a stream associated with the service in the local network.

4. The method as claimed in claim 1, in which the first label also comprises a duration specifying a time for which the network gateway must guarantee the reservation of the bandwidth.

5. The method as claimed in claim 1, further comprising the following acts performed by the service platform:
receiving the first request for access to the service, originating from the user terminal via a network gateway, said request selecting a service offered by the service platform,
after selection of the service, determining the parameter defining a bandwidth necessary for the execution of the selected service, and
generating and dispatching to the terminal, via the network gateway, the universal address of the selected service.

6. The method as claimed in claim 1, comprising reception from the user terminal of a second request for access to said service, said reception of a second request being representative of an actual reservation by the network gateway of the bandwidth necessary for the execution of the service.

7. A system comprising:
a network gateway of a local network, said local network including at least one user terminal, a user of said terminal wishing to access a service delivered by a service platform, the network gateway comprising:
first reception means for receiving a first request for access to the service, originating from the user terminal and destined for the service platform, said request selecting the service,
reception and transmission means for receiving from the service platform, after selection of the service from the terminal, and for transmitting to the terminal a universal address of the selected service comprising a domain name, said domain name comprising in a first label at least one parameter defining a bandwidth necessary for execution of the selected service, and other labels forming a name of the service platform,
second reception means for receiving from the terminal a resolution request in respect of the domain name,
means for analyzing the domain name and configuring the network gateway to reserve a bandwidth necessary for execution of the service for a stream lying between the terminal and the service platform, said bandwidth being included in the first label of the domain name, and
dispatching means for dispatching the IP address associated with the name of the service platform to the terminal; and the network service platform, configured to deliver the at least one service to the at least one user terminal of the local network via the network gateway, said platform comprising:

reception means for receiving the first request for access to the service, originating from the user terminal via the network gateway, determination means for determining at least one parameter defining a quality of service for execution of the selected service, generation and dispatching means for generating and dispatching to the user terminal via the network gateway the universal address of the service selected from the user terminal, said address comprising the domain name.

* * * * *